Dec. 25, 1923.

J. H. BROWN 1,478,729

KETTLE

Filed Aug. 17, 1922

INVENTOR.
JOHN HILTON BROWN.

By Fetherstonhaugh & Co
ATTORNEYS.

Patented Dec. 25, 1923.

1,478,729

UNITED STATES PATENT OFFICE.

JOHN HILTON BROWN, OF VANCOUVER, BRITISH COLUMBIA, CANADA, ASSIGNOR TO CHARLES HADAWAY, OF VANCOUVER, BRITISH COLUMBIA, CANADA.

KETTLE.

Application filed August 17, 1922. Serial No. 582,441.

*To all whom it may concern:*

Be it known that I, JOHN HILTON BROWN, a subject of the King of Great Britain, and a resident of the city of Vancouver, in the Province of British Columbia, Canada, have invented certain new and useful Improvements in Kettles, of which the following is a specification.

My invention relates to improvements in kettles and the object of the invention is to utilize the heat contacting directly with the kettle to a maximum extent and also to utilize the heat passing off therefrom and which is ordinarily wasted and it consists essentially of a kettle having a central vertical flue therein through which the heat is drawn from the heat source, the upper end of which is adapted to serve as a support for a vessel, the contents of which it is desired to heat as hereinafter more particularly described by the following specification.

In the drawings like characters of reference indicate corresponding parts in each figure.

Figures 1, 2:
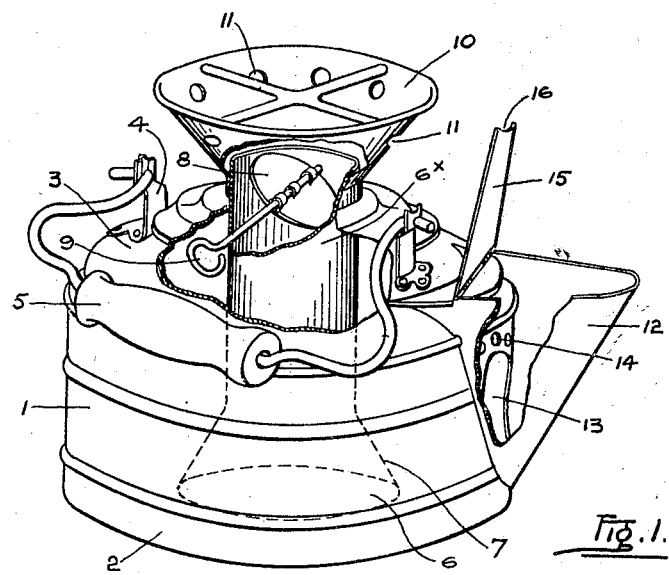
Fig. 1 is a perspective view of my kettle partially broken away and partially in section.
Fig. 2 is a cross sectional view through Fig. 1.

1 indicates my kettle body which is of any desired shape or construction. 2 is the kettle bottom and 3 the kettle top. 4 are lugs extending from the kettle top and 5 is a handle hinged to the lugs 4. 6 is an orifice in the kettle bottom. $6^x$ is a cylindrical open-ended flue extending through the top to a point adjacent the bottom of the kettle and of smaller diameter than the opening in the kettle bottom. 7 is a conical bell connecting the lower end of the flue $6^x$ to the kettle bottom around the orifice 6. 8 is a pivotally mounted damper disposed at the upper end of the flue $6^x$ and controlled by the turn button 9.

10 indicates an inverted conical portion secured to or carried by the upper end of the flue $6^x$. The upper end of the portion 10 may be provided with a light grid cover upon which a vessel of any desired size may be supported. 11 indicates a plurality of apertures for the emission of heat during such times as the base of the cone is fully covered by a vessel which is being heated thereon. 12 indicates a spout communicating with the kettle body by the aperture 13. 14 indicates a plurality of apertures to permit of free escapement of steam. 15 is a spout cover hingedly connected thereto having a cut away portion 16 at its outer end that water may be freely poured from the kettle while the spout cover is in closed position.

Having described the several parts of my invention, I will now briefly explain its use.

The cover 15 is raised to vertical position and the kettle filled through the spout 12, and the kettle set over a gas jet. If desired to heat the contents of the kettle only, the damper 8 is turned to such a position that a small air passage is permitted through the flue $6^x$ to induce a current of air therethrough which in turn prevents the heat from the flame from being wasted outside of the kettle and draws such heat inwardly into contact with the converging sides of the bell 7 and the sides of the flue $6^x$, thus increasing the heating surface of the kettle and using such heat to ultimate effect.

When desired to heat my kettle and another vessel from the same jet, it suffices to place the second vessel upon the inverted cone 10 and set the damper into open position, the handle 5 meanwhile lying to the side of the cone, when the heat which has passed upwardly through the flue $6^x$ is directed to the bottom of such vessel.

It will thus be seen that I have devised a kettle which enables a single gas jet to be used for simultaneously heating its own, and the contents of a further vessel, and which presents a greater heating surface to the flame than exists in kettles of common construction thereby effecting a considerable saving of fuel.

What I claim as my invention is:

A kitchen utensil comprising a container provided with an internal flue rising from the bottom to a point above the top of the container, a damper plate pivotally mounted in the flue at a point immediately above the top of the container, an inverted frusto-conical supporting shell fixed to the upper end of the flue exteriorly of the container, said supporting shell being provided with lateral apertures for the escape of the heated air rising through the flue and a receptacle supporting grid fixed in the upper end of said shell.

Dated at Vancouver, B. C., this 28th day of June, 1922.

JOHN HILTON BROWN.

Witnesses:
J. J. JOHNSTON,
ERNEST E. CARVER.